Figure 1:
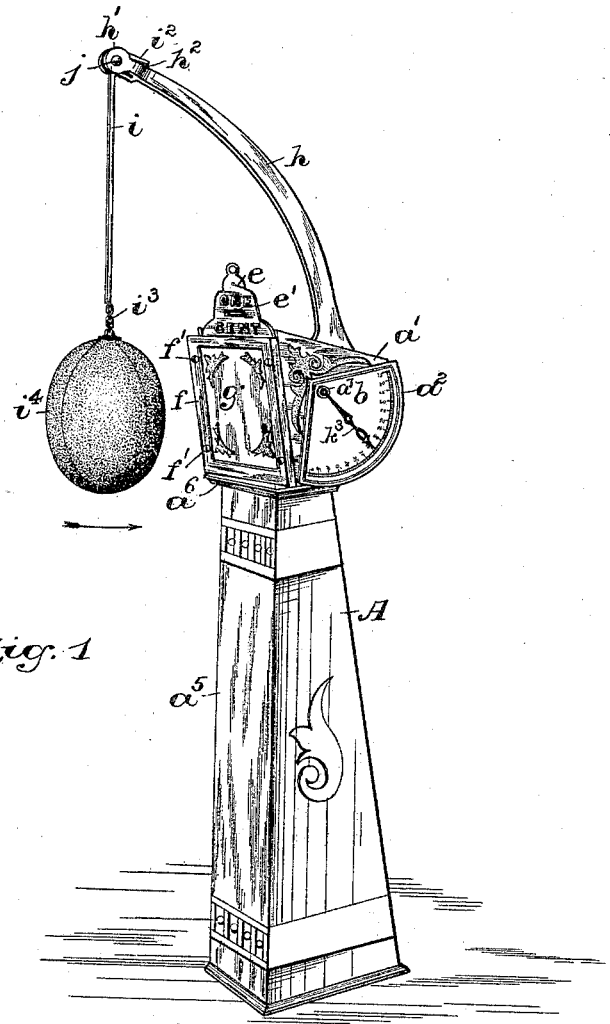

(No Model.)  3 Sheets—Sheet 1.

G. TROXLER, Jr.
COIN CONTROLLED STRIKING AND STRENGTH TESTING MACHINE.

No. 495,571. Patented Apr. 18, 1893.

WITNESSES:
Wm. H. Camfield, Jr.
F. deL. Robinson.

INVENTOR:
Gustavus Troxler, Jr.,
BY Fred'k C. Fraentzel, ATT'Y.

(No Model.) 3 Sheets—Sheet 2.

G. TROXLER, Jr.
COIN CONTROLLED STRIKING AND STRENGTH TESTING MACHINE.

No. 495,571. Patented Apr. 18, 1893.

WITNESSES:
Wm. H. Camfield Jr.
F. deL. Robinson

INVENTOR:
Gustavus Troxler, Jr.,
BY Fred C. Fraentzel, ATT'Y.

(No Model.) 3 Sheets—Sheet 3.

G. TROXLER, Jr.
COIN CONTROLLED STRIKING AND STRENGTH TESTING MACHINE.

No. 495,571. Patented Apr. 18, 1893.

WITNESSES:
Wm. H. Camfield Jr.
F. de L. Robinson

INVENTOR:
Gustavus Troxler, Jr.
BY Fred C. Fraentzel, ATT'Y.

UNITED STATES PATENT OFFICE.

GUSTAVUS TROXLER, JR., OF NEWARK, NEW JERSEY, ASSIGNOR, BY DIRECT AND MESNE ASSIGNMENTS, TO THE TROXLER NOVELTY INTRODUCTION COMPANY, OF NEW JERSEY.

COIN-CONTROLLED STRIKING AND STRENGTH-TESTING MACHINE.

SPECIFICATION forming part of Letters Patent No. 495,571, dated April 18, 1893.

Application filed December 21, 1892. Serial No. 455,881. (No model.)

*To all whom it may concern:*

Be it known that I, GUSTAVUS TROXLER, Jr., a citizen of the United States, residing at Newark, in the county of Essex and State of New Jersey, have invented certain new and useful Improvements in Striking and Strength-Testing Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention, has reference to an improved form of coin-controlled striking and strength-testing machine, and has for its object to provide more effectual means than those now in use for registering the force of a blow from the arm of a person.

A further object of the invention is to provide a means whereby an alarm is sounded when a coin is dropped into the apparatus, thereby indicating that the mechanism of the machine is in its proper working order to be operated upon by a blow from the arm of a person.

Another object is to provide an inexpensive, compact and durable apparatus for the purpose of registering the force of a blow from the arm.

The invention consists essentially of a coin-controlled mechanism, an operating face-plate and a punching ball or bag, suspended from a suitable arm on the machine, adapted to be punched and forced against the face-plate which operates the coin-controlled mechanism and thereby registers the force of the blow.

The invention further consists of the construction and arrangement of the parts, as will be hereinafter more fully described and finally embodied in the clauses of the claim.

The invention is illustrated in the accompanying sheets of drawings, forming part of this specification, in which similar figures of reference are employed to indicate corresponding parts in the several views.

Figure 2:
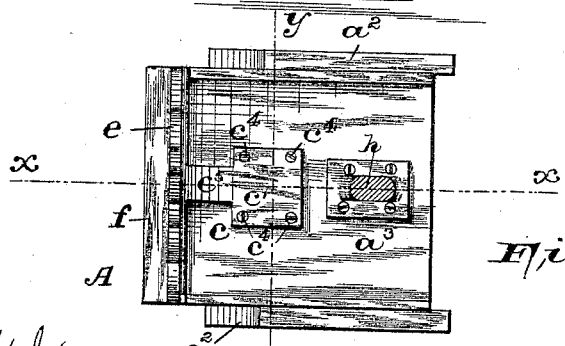
Figure 3:
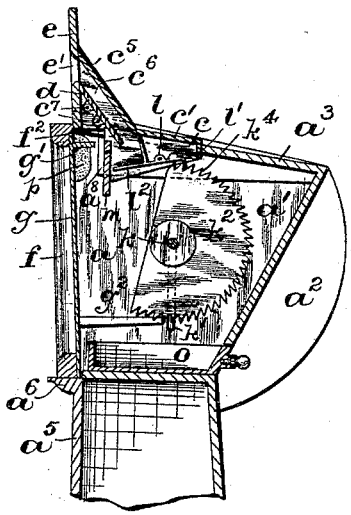
Figure 4:
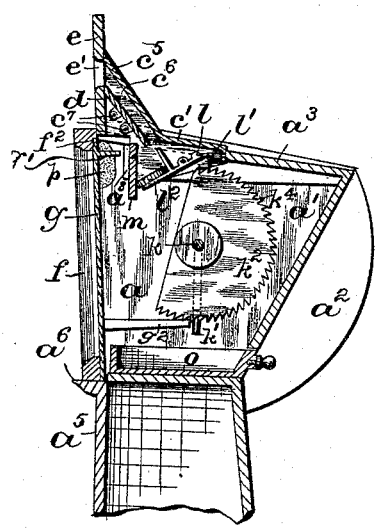
Figure 5:
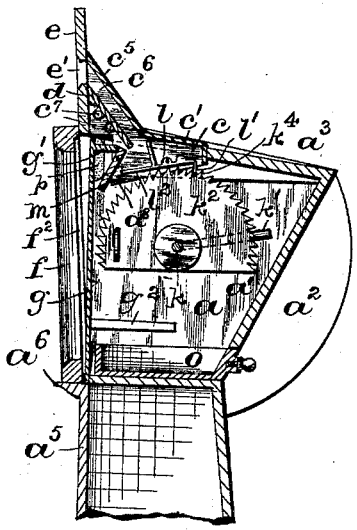
Figure 6:
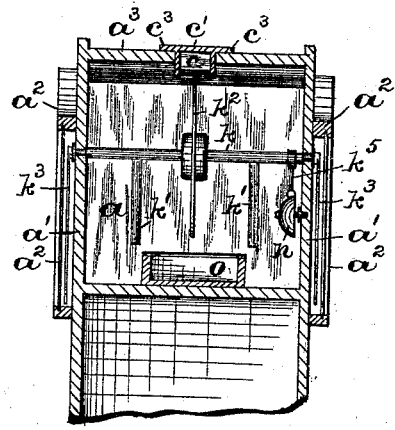
Figure 7:
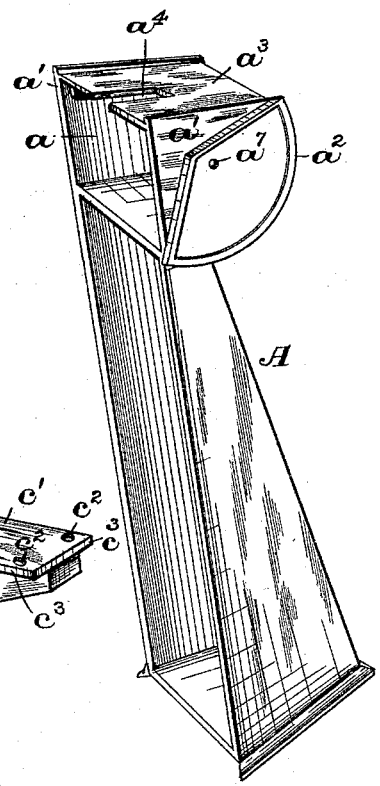
Figure 8:
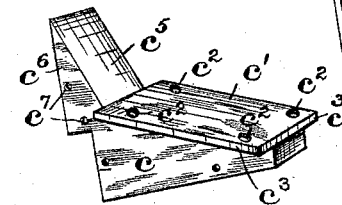
Figure 9:
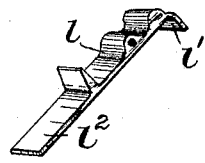
Figure 10:
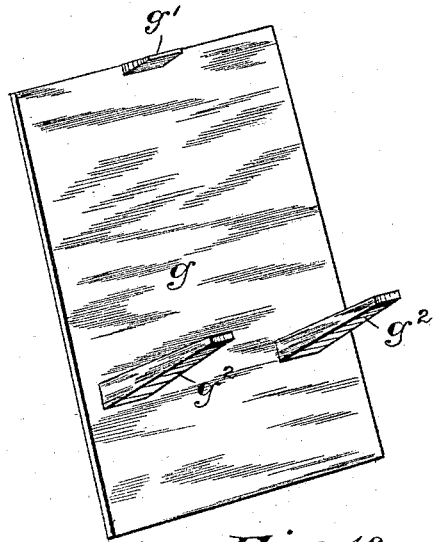
Figure 11:
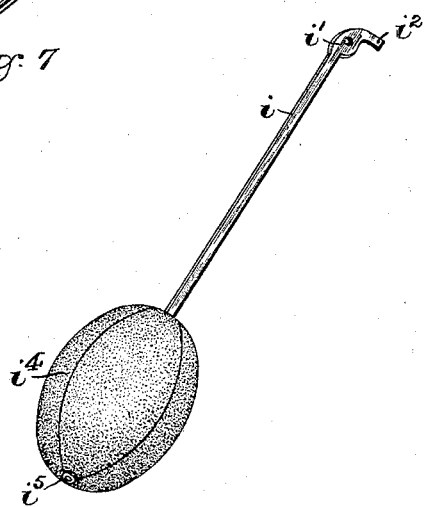

In said views, Figure 1 is a perspective view of the coin-controlled striking and strength testing apparatus, and Fig. 2 is a top view of the same, the arm from which the punching bag or ball is suspended being represented in cross-section. Fig. 3 is a vertical section taken on line $x$ in Fig. 2, clearly illustrating the inner mechanism of the machine in its initial position before being operated by a coin. Fig. 4 is a similar view, illustrating the relative positions of the coin-controlled mechanism, when a coin has been dropped in the machine, the mechanism thereby being brought into a position that it can be operated when the punching ball comes in contact with the face-plate of the machine; and Fig. 5 is a like view of said mechanism, after the face-plate has been operated upon by the punching bag, thereby causing said mechanism to be worked and registering the force of the blow, and also releasing the previously deposited coin. Fig. 6 is a cross-section taken on line $y$ in said Fig. 2. Fig. 7 is a perspective view of the main frame of the machine, to more clearly illustrate the construction of the same. Fig. 8 is a perspective view of a coin chute used in connection with the machine; and Fig. 9 is a perspective view of the coin-operated lever used for releasing the mechanism after a coin has been dropped into the machine. Fig. 10 is a perspective view of one form of face-plate, against which the punching bag or ball is forced, provided with fingers or spurs for operating the registering mechanism and releasing the coin. Fig. 11 is a perspective view of a slightly modified form of punching ball or bag and a rod on which it is secured, for suspending the bag or ball from the arm connected with the frame of the machine.

Referring to the drawings, A designates a suitable case or inclosure made of wood or metal, which is provided on its upper portion, formed either integrally therewith or secured thereto in any well-known manner, with a chamber $a$ in which is arranged the coin-controlled registering mechanism. Said casing $a$ is provided on one or both of its opposite sides $a'$ with a suitable frame $a^2$ in which frame is arranged a dial $d$. Said frame $a^2$ may be formed integral with the side $a'$ of the casing $a$ or it can be otherwise secured thereto, as will be understood.

In the upper side $a^3$ of the casing $a$, I have formed a slot $a^4$ in which is arranged a suitable coin chute $c$. The upper portion $c'$ of said chute is preferably made wider than the main body of the chute and is provided with screw holes $c^2$, so that when said chute $c$ is placed in said slotted portion $a^4$, the parts $c^3$ of said side $c'$ will rest upon the upper side $a^3$ of the chamber $a$, whereby the chute can be suitably secured to said slide $a^3$ by means of screws or pins $c^4$, as will be evident from Fig. 2. As will be seen from Figs. 3, 4, 5 and 8, the main portion $c$ of said chute is provided with an upwardly inclined plate $c^5$ forming with a plate $d$ secured between the two sides of said chute a passage-way $c^6$ for a coin to be deposited upon a releasing lever in the body of the machine. Said plate $d$ is secured between the sides of the chute $c$ preferably by means of screws or rivets $c^7$. Secured to the upper portion of said chamber $a$ and against the front edges of the sides of the chute $c$ is an ornamental plate $e$ provided with an opening $e'$, into which a coin can be dropped, and passed down into the coin chute.

Upon a suitable molding or projection $a^6$ on the front $a^5$ of the base of the machine, I have arranged an open frame $f$ which is secured against the open side of said casing $a$ by means of suitable screws or pins $f'$. Said frame $f$ has on its inner surface a recess $f^2$ in which is loosely placed a face-plate $g$ provided with the fingers or spurs $g'$ and $g^2$.

Extending up from the upper surface $a^3$ of the chamber $a$ is a suitable arm $h$ which is preferably forked at its free end, as at $h'$. Within said forked end $h'$ is pivotally arranged by means of a pin $j$ a suitable rod $i$ which is flat, as at $i'$, to prevent any side movement of the rod in the forked end $h'$, and which rod $i$ is also provided with a suitable stop $i^2$ which limits its forward swinging movement when said stop $i^2$ comes in contact with the surface $h^2$ of the arm $h$, as will be clearly understood from Fig. 1. Said rod $i$ may be provided at its lower end with a short piece of chain $i^3$, or the equivalent therefor, to which is secured the punching ball or bag $i^4$. Said bag or ball $i^4$ may be of the usual form of punching bag, being filled with air, or said bag may be stuffed and may be secured on the lower end of the rod $i$ as indicated in Fig. 11, in which case said rod passes directly through the ball and has a nut or fastening device $i^5$ on the end thereof. It will thus be seen that when the bag or ball $i^4$ is punched it moves from the position illustrated in Fig. 1 in the direction of the arrow shown, until it comes in contact with the face-plate $g$, whereby said face-plate is forced from the position in its frame $f$, shown in Fig. 3, to that position illustrated in Fig. 5, and after having operated the registering mechanism in the chamber $a$ drops of its own accord to its former position illustrated in said Fig. 3. Within said chamber $a$ and journaled in openings $a^7$ in the sides $a'$ thereof is a rod $k$ provided with downwardly extending arms $k'$. On said rod $k$ is arranged a suitable ratchet wheel $k^2$ and on the free ends of said rod $k$ are secured the index hands $k^3$.

Pivoted within the coin chute $c$ is a suitable coin-operated lever $l$ provided with a projection $l'$ at its free end which is in normal engagement with one of the sprocket teeth $k^4$ of the sprocket wheel $k^2$. When said lever $l$ is in its normal position, it is in that position indicated in Figs. 3 and 5, and when a coin is deposited in the opening $e'$ and passes down the coin chute it drops upon the end $l^2$ of said lever, said lever assuming the position illustrated in Fig. 4, the coin being retained on said end $l^2$ of the lever by coming in contact with a pivoted plate $m$. At the same time the projection $l'$ on the lever is forced out of its holding engagement with its previously engaged tooth $k^4$ on the sprocket wheel $k^2$.

Suppose that the mechanism had previously been operated and that the ratchet wheel and the coin-operated lever $l$ are in the position illustrated in Fig. 5 and the index hand $k^3$ registers "35," as shown in Fig. 1, then after the deposited coin has forced the lever $l$ to assume said tilted position, represented in Fig. 4, said arms $k'$ will return from their raised positions in Fig. 5 to their normal positions in Fig. 4, at the same time bringing an arm $k^5$ secured to the rod $k$ in contact with a suitable bell $n$, thereby sounding an alarm indicating to the person about to strike the ball or bag that the mechanism is in its proper position to be operated upon by the face-plate $g$. When the bag or ball $i^4$ strikes said face-plate and causes it to assume the position illustrated in Fig. 5, the finger or spur $g'$ causes said pivoted plate $m$ to move outwardly thereby allowing the coin to drop from the end $l^2$ of the lever $l$ into a suitable money drawer $o$. At the same time the fingers or spurs $g^2$ on said face plate $g$ have been suddenly brought in contact with the arms $k'$ of the rod $k$ and by means of the sudden blow, said arms $k'$ are forced upwardly and the downwardly projecting end $l'$ of the now released lever $l$ will catch into one of the teeth on said sprocket wheel $a^2$, and the force of the blow will be registered on the dial or dials $b$, as will be evident. The bag or ball $i^4$ and the rod $i$ immediately return to their normal positions and the face plate $g$ drops back into position in the recess $f^2$ in the frame $f$, while said pivoted plate $m$ also returns to its former and normal position in the chute $c$. As soon as a second coin is passed down upon the lever $l$ the ratchet wheel $k^2$ is again released, causing the index hand or hands $k^3$ to pass back to the zero point on the dial or dials $b$, and the mechanism can be again operated by forcing the back or ball $i^4$ against the face-plate $g$. The mechanism is of such a construction that, after a blow has been registered no other blow can be registered no matter how hard the ball or bag $i^4$ is forced against the face-plate $g$, unless another coin is deposited in the machine whereby the registering mechanism is returned to its initial point, which fact will be indicated by the index hand or hands $k^3$ pointing to zero.

It will be understood, that variations of construction and arrangement of the various parts hereindescribed may be made without departing from the scope of my present invention. For instance, the chute may be made in several pieces or may be formed integral with the sides of the chamber $a$, and the system of operating levers may be differently arranged. The alarm gong $m$ and its striker $k^5$ may also be differently arranged and secured in any other suitable part of the chamber $a$, from that illustrated in Fig. 6. Hence I do not wish to limit myself to the exact form of mechanism herein shown and described.

The money drawer $o$ is provided with a suitable lock and key, as will be understood.

It will be seen that by these improvements, a simple and effectively working striking and strength testing apparatus has been devised, by means of which the force of a blow from the arm of a person is accurately registered and indicated on the dial plate of the registering mechanism used in connection with the apparatus.

In order to limit the movement of the face-plate $g$ when the latter is struck by the ball or bag $i^4$, I have provided said plate with suitable cushions $p$ of rubber or felt, which come in contact with a projection $a^8$ formed on one or both of the sides $a'$ of the chamber $a$ when said plate is forced into the same and whereby the movement of said face-plate $g$ is limited and is thereby prevented from being too suddenly brought in operative contact with the fingers $k'$ on the rod $k$.

Having thus described my invention, what I claim is—

1. In a striking machine, the combination, with a ball or punching bag pivotally suspended from an arm on the casing of the machine, of a movable face-plate mounted in the front of the machine, against which said ball or bag is adapted to be forced, and mechanism adapted to be operated by said face-plate to register the force of a blow, substantially as and for the purposes set forth.

2. In a striking machine, the combination, with a ball or punching bag pivotally suspended from an arm on the casing of the machine, of an open frame secured to the front of the machine and a movable face-plate mounted in said open frame against which said ball or bag is adapted to be forced, and mechanism adapted to be operated by said face-plate to register the force of a blow, substantially as and for the purposes set forth.

3. In a striking machine, the combination, with a ball or punching bag pivotally suspended from an arm on the casing of the machine, of a movable face-plate mounted in the front of the machine, against which the ball or bag is adapted to be forced, and mechanism adapted to be operated by said face-plate to register the force of a blow, said mechanism comprising therein, a ratchet wheel mounted on a rod, and a coin-controlled lever in engagement with said ratchet wheel, substantially as and for the purposes set forth.

4. In a striking machine, the combination, with a ball or punching bag pivotally suspended from an arm on the casing of the machine, of a movable face-plate mounted in the front of the machine, against which said ball or bag is adapted to be forced, a coin chute in said casing, comprising therein a passage $c^6$, a coin-controlled lever $l$ and a swinging plate $m$, a rod $k$ in said casing of the machine having a ratchet wheel thereon with which said coin-controlled lever is in normal holding engagement, and an index hand on one or both ends of said rod, and means connected with said face-plate for operating said mechanism in the casing, when said ball or bag is forced against the face-plate, substantially as and for the purposes set forth.

5. In a striking mechanism, the combination, with the registering mechanism and a coin chute $c$, of a lever adapted to be partially tilted by the weight of a deposited coin, and a swinging plate $m$, for retaining the deposited coin upon said tilted lever, both said lever and plate $m$ being pivotally arranged within said coin chute, substantially as and for the purposes set forth.

6. In a striking machine, the combination, with the registering mechanism and a coin chute $c$, of a lever adapted to be partially tilted by the weight of a deposited coin, a swinging plate $m$ for retaining the deposited coin upon said tilted lever, both said lever and plate $m$ being pivotally arranged within said coin chute, and a movable face-plate arranged in the front of the casing of the machine provided with a finger or stud adapted to engage with said swinging plate $m$, substantially as and for the purposes set forth.

7. In a striking machine, the combination, with the registering mechanism consisting essentially of a rod journaled in the sides of the casing and provided with an index hand on one or both of its ends, arms $k'$ and a ratchet wheel on said rod, and a coin chute, of a lever adapted to be partially tilted by the weight of a deposited coin, a swinging plate $m$ for retaining the deposited coin upon said tilted lever, and a movable face-plate arranged in the front of the casing of the machine provided with fingers or studs on the back thereof, adapted to engage with said swinging plate $m$ and with said arms $k'$, substantially as and for the purposes set forth.

8. In a striking machine, the combination, with the casing of the machine and the registering mechanism therein, of an upwardly extending arm $h$ secured to the top of the casing, a rod $i$ provided with a finger $i^2$ pivoted in the free end of said arm $h$, a punching bag or ball on the lower end of said rod $i$, and a movable face-plate mounted in the front of the machine, against which said bag or ball is adapted to be forced, substantially as and for the purposes set forth.

9. In a striking machine, the combination, with the casing of the machine and the registering mechanism therein, of an open frame secured to the front of said casing, and a movable face-plate in said frame, a stop or projection $a^8$ in said casing, and suitable cushions $p$ to limit the inward movement of said face-plate and means on said face-plate to operate the registering mechanism, substantially as and for the purposes set forth.

10. In a striking machine, the combination, with the casing of the machine, of an upwardly extending arm $h$ secured to the top of the casing, a rod $i$ provided with a finger $i^2$ pivoted in the free end of said arm $h$, a punching bag or ball on the lower end of said rod $i$, a movable face-plate mounted in the front of the machine, against which said ball or bag is adapted to be forced, a registering mechanism and a coin chute in said casing, a lever pivotally arranged in said coin chute and adapted to be tilted by the weight of a coin, a swinging plate $m$ for retaining the deposited coin upon said tilted lever, and means on the back of said movable face plate adapted to engage with said swinging plate $m$ and with the registering mechanism, substantially as and for the purposes set forth.

11. In a striking machine, the combination, with the casing of the machine, of an upwardly extending arm $h$ secured to the top of the casing, a rod $i$ provided with a finger $i^2$ pivoted in the free end of said arm $h$, a punching bag or ball on the lower end of said rod $i$, a movable face-plate mounted in the front of the machine, against which said ball is adapted to be forced, a registering mechanism consisting essentially of a rod journaled in the sides of the casing and provided with an index hand on one or both of its ends, arms $k'$ on said rod, and a ratchet wheel on said rod, a coin chute, a lever $l$ in said chute adapted to be partially tilted by the weight of a coin, and a swinging plate $m$, for retaining the deposited coin on said tilted lever and means on the back of said movable face-plate adapted to engage with said swinging plate $m$ and said arms $k'$, all of said parts being arranged substantially as and for the purposes set forth.

In testimony that I claim the invention set forth above I have hereunto set my hand this 19th day of December, 1892.

GUSTAVUS TROXLER, JR.

Witnesses:
FRED. C. FRAENTZEL,
WM. H. CAMFIELD, Jr.